United States Patent
Yajima et al.

[11] Patent Number: 6,018,964
[45] Date of Patent: Feb. 1, 2000

[54] METHOD FOR MANUFACTURING QUARTZ GLASS

[75] Inventors: Shouji Yajima, Sagamihara; Hiroki Jinbo, Kawasaki, both of Japan

[73] Assignee: Nikon Corporation, Tokyo, Japan

[21] Appl. No.: 09/031,516

[22] Filed: Feb. 27, 1998

[30] Foreign Application Priority Data

Feb. 28, 1997 [JP] Japan ................................. 9-045565

[51] Int. Cl.[7] ............................ C03B 5/24; C03B 18/18; C03B 19/06; C03B 37/07; C03B 37/018

[52] U.S. Cl. .................... 65/29.12; 65/29.12; 65/17.4; 65/384; 65/414

[58] Field of Search .................................. 65/17.4, 17.6, 65/17.3, 17.5, 144, 29.19, 29.14, 29.12, 384, 377, 414, DIG. 8

[56] References Cited

U.S. PATENT DOCUMENTS

| | | |
|---|---|---|
| 4,419,116 | 12/1983 | Nakahara et al. . |
| 4,419,118 | 12/1983 | Reiji et al. ............................ 65/17.4 |
| 4,740,226 | 4/1988 | Toda . |

FOREIGN PATENT DOCUMENTS

| | | | |
|---|---|---|---|
| 0 720 970A1 | 7/1996 | European Pat. Off. . | |
| 54-131034 | 10/1979 | Japan | 65/17.4 |
| 59-164644 | 9/1984 | Japan | 65/17.4 |
| 60-155538 | 8/1985 | Japan . | |
| 1-257146 | 10/1989 | Japan . | |
| 4-154639 | 5/1992 | Japan | 65/DIG. 8 |
| 6-234531 | 8/1994 | Japan . | |
| 7 017737 | 1/1995 | Japan . | |
| 2059944 | 4/1981 | United Kingdom | 65/17.4 |

*Primary Examiner*—Stanley S. Silverman
*Assistant Examiner*—Jacqueline A. Ruller
*Attorney, Agent, or Firm*—Morgan, Lewis & Bockius LLP

[57] ABSTRACT

A method for manufacturing quartz glass in a flame hydrolysis reaction inside a furnace, including the steps of mixing a gas containing Si, a combustion-supporting gas, and a combustible gas and discharging this mixed gas from a burner; producing a quartz glass powder by causing the mixed and discharged gases to react in a flame within the furnace while an opening area of an opening and shutting system of the furnace is controlled; and producing a quartz glass ingot by depositing and vitrifying the quartz glass powder on a target surface facing an interior of the furnace, wherein said producing step includes the step of controlling the opening area of the opening and shutting system of the furnace in accordance with the amount of growth of the ingot on the target surface.

15 Claims, 4 Drawing Sheets

VERTICAL DIRECTION INGOT GROWTH

METHOD FOR MANUFACTURING QUARTZ GLASS

This application claims the benefit of Japanese Application No. 09-045565, filed in Japan on Feb. 28, 1997, which is hereby incorporated by reference.

BACKGROUND OF THE INVENTION

1. Field of the Invention

The present invention relates to an ingot manufacturing apparatus and related method of manufacturing the ingot. More particularly, the invention concerns a quartz glass ingot manufacturing apparatus and method.

2. Discussion of the Related Art

It has been proposed that synthetic quartz glass and fluoride single crystals, such as fluorite, be used in place of conventional optical glasses in the lenses of illumination optical systems or projection optical systems of reduction exposure apparatus that expose and transfer fine patterns of integrated circuits onto wafers consisting of silicon and the like. Such quartz glass materials utilized in optical systems of reduction exposure apparatus must have a high transmissivity with respect to ultraviolet light as well as a high degree of refractive index uniformity. For example, when quartz glass is used as a projection lens material in photolithography, the glass must be free of striae in all three directions. Moreover, the refractive index uniformity $\Delta n$ must be $4 \times 10^{-6}$ or less in the direction of the optical axis; the refractive index distribution in the direction of the optical axis of the lens must show center symmetry; the RMS value of the rotational non-symmetrical element must be 0.0050 $\lambda$ or less; and the RMS value of the rotational symmetrical 2nd/4th-order residual must be 0.0050 $\lambda$ or less. Furthermore, in order to realize a high transmissivity with respect to ultraviolet light, it is necessary to suppress the concentration of impurities in the quartz glass.

For this purpose, an apparatus has been proposed that is equipped with a furnace having an opening part in the bottom, a target surface that faces this opening part, and a burner used for quartz glass synthesis in which quartz glass is manufactured by a flame hydrolysis method by which an Si compound gas constituting the raw material of the quartz glass and a combustion gas used for heating are caused to flow out from the burner, and in which soot is deposited with the flame of the burner. Since the admixture of impurities can easily be suppressed using this flame hydrolysis method, quartz glass with a high purity can be obtained.

However, while the concentration of impurities can be suppressed when quartz glass is manufactured by this flame hydrolysis method, the glass produced is often unsatisfactory because of striae generated in the finished product as a result of a non-uniform temperature distribution and with regard to the uniformity of the refractive index in the direction of the optical axis. Here, the uniformity of the refractive index depends on the temperature distribution in the direction of the diameter of the ingot when the ingot is formed on the target. Accordingly, a quartz glass manufacturing apparatus has been proposed in which the target is caused to rotate in order to adjust the temperature distribution of the head portion of the ingot so that the uniformity of the refractive index is optimized. Also, in this apparatus the burner and ingot are caused to undergo relative planar motion in accordance with the temperature distribution of the head portion of the ingot (Japanese Patent Application Kokai No. 6-234531). In this apparatus, a temperature distribution that optimizes the uniformity of the refractive index is formed. As a result, quartz glass with an improved uniformity can be obtained.

This quartz glass manufacturing apparatus has an exhaust port that is used to exhaust the chlorine gas, and the like, that is generated during the synthesis of the ingot. Secondary air used for exhaust purposes is supplied from the opening and shutting system formed in the bottom of the furnace.

In the above-mentioned quartz glass manufacturing apparatus, the ingot synthesized on the target surface becomes larger in size as time passes during the manufacturing process. As a result, the opening area of the opening and shutting system formed in the bottom of the furnace becomes smaller as the ingot gets larger. When the area of the opening and shutting system is reduced in this way, exhaust efficiency drops so that the temperature inside the furnace rises. Furthermore, as the ingot is synthesized, a deposit of $SiO_2$ powder not captured by the synthesized surface of the ingot adheres to the exhaust piping so that the exhaust efficiency drops, also contributing to an increase in the temperature inside the furnace. As the temperature inside the furnace rises, the temperature in the vicinity of the synthesized surface of the ingot also rises, resulting in a drop in viscosity of the ingot causing the ingot to collapse. Such a temperature rise might conceivably be prevented by reducing the flow rate of the combustion gas from the burner. This arrangement, however, results in differences in the quantity of heat supplied by the burner or a temperature distribution, resulting in the generation of striae on the ingot, thus lowering the quality of the finished product.

SUMMARY OF THE INVENTION

Accordingly, the present invention is directed to a quartz glass manufacturing apparatus and method that substantially obviates one or more of the problems due to limitations and disadvantages of the related art.

An object of the present invention is to provide a quartz glass manufacturing apparatus and method that results in an ingot having a uniform refractive index and that is free of veins.

Another object of the present invention is to provide a quartz glass manufacturing apparatus and method that maintains a constant temperature within the furnace during the manufacturing process.

Another object of the present invention is to provide a quartz glass manufacturing apparatus and method that heats the ingot uniformly within the furnace during the manufacturing process.

Additional features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described, the quartz glass manufacturing apparatus includes a furnace having an interior and a variable opening and shutting system at its bottom area; a target surface facing the interior of the furnace for supporting an ingot of quartz glass during formation of the ingot within the furnace; a burner for quartz glass synthesis having a tip end facing the target surface; an exhaust system installed within the furnace for discharging air flowing in from the variable opening and shutting system; and an altering mechanism for varying an opening area of the variable opening and shutting system.

In another aspect of the instant invention, a method for manufacturing quartz glass in a flame hydrolysis reaction inside a furnace is provided which includes the steps of mixing a gas containing Si, a combustion-supporting gas, and a combustible gas and discharging this mixed gas from a burner; producing a quartz glass powder by causing the mixed and discharged gases to react in a flame within the furnace while an opening area of an opening and shutting system of the furnace is controlled; and producing a quartz glass ingot by depositing and vitrifying the quartz glass powder on a target surface facing an interior of the furnace.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
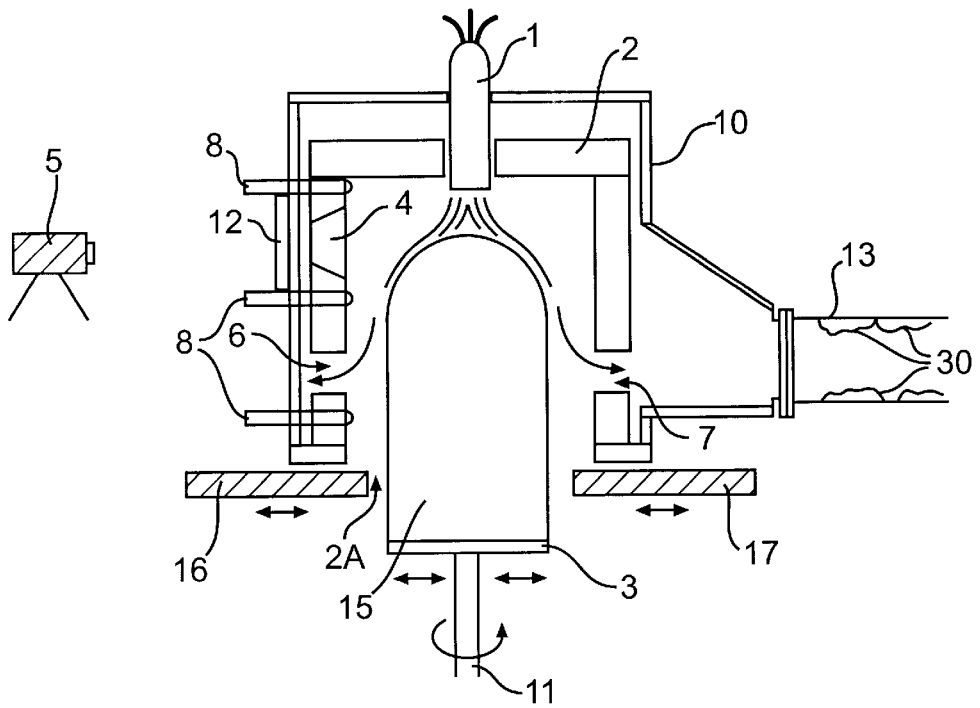
FIG. 1 shows the arrangement of a quartz glass manufacturing apparatus in accordance with a preferred embodiment of the present invention.

FIG. 1 shows a quartz glass manufacturing apparatus which is equipped with a furnace 2 having an opening and shutting system 2A in its bottom area, a target surface 3 used for supporting the ingot during ingot formation, which is installed so that the target surface faces the interior of the above-mentioned furnace 2 from a variable opening and shutting system 2B. The manufacturing apparatus also includes a burner 1 used for quartz glass synthesis, which is installed so that its tip end faces the target surface 3, and an exhaust system 13 that discharges air flowing into the above-mentioned furnace 2 from the variable opening and shutting system 2B to the outside of the furnace 2. An ingot 15 of quartz glass is formed on the target surface 3 inside the furnace 2. The manufacturing apparatus is equipped with an altering mechanism 16 through 19, 20 that makes it possible to alter the opening area of the variable opening part 2B.

The manufacturing apparatus is further equipped with a temperature measuring device 8 that measures the temperature inside the furnace 2, as well as a control system 21 that controls the altering mechanism 16 through 19, 20 so that the opening area of the variable opening and shutting system 2B is altered on the basis of the measurement results obtained by the above-mentioned temperature measuring device 8.

The manufacturing apparatus is further equipped with a moving mechanism that causes the target surface 3 to undergo relative planar motion with respect to the burner 1 on a horizontal plane of movement in accordance with the temperature distribution in the direction of the diameter of the head portion of the ingot 15 formed on the target surface 3. The opening and shutting system 2B is designed with a particular shape that is suited to the range of movement of the target surface 3.

Figure 2:
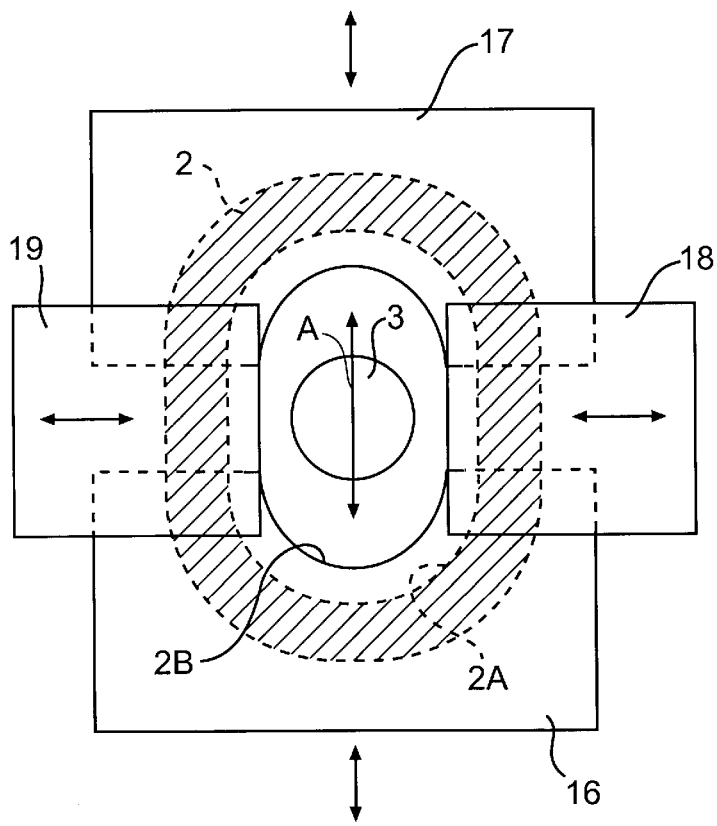
FIG. 2 shows a horizontal sectional view of the quartz glass manufacturing apparatus of FIG. 1.

In the quartz glass manufacturing apparatus of a preferred embodiment of the instant invention of FIG. 1, a furnace interior space with an oval cross section, as shown in FIG. 2, is formed inside the furnace 2. A burner 1 is installed in the upper portion of the furnace 2 so that the tip end portion of this burner 1 faces the target surface 3. An observation window 4 for an IR camera 5, as well as exhaust ports 6 and 7, are respectively formed in the furnace walls. Furthermore, the temperature inside the furnace 2 is measured by means of a thermocouple 8. The target surface 3 used for the formation of an ingot 15 is installed in the lower portion of the furnace 2, and this target surface 3 is arranged so that it can be rotated and swung in the left-right direction of FIG. 1 (for example, in the direction indicated by the arrows in FIG. 2) via a supporting shaft 11 by means of a motor (not shown in the figures) that is installed outside the furnace 2. Furthermore, the target surface 3 is arranged so that it can be lowered in accordance with the growth rate of the ingot.

The furnace 2 is surrounded by a furnace frame 10, and an observation window 12 is formed in the furnace frame 10 in a position corresponding to an interior observation window 4. Furthermore, an exhaust pipe 13 is connected to the furnace frame 10, and conducts exhaust from the exhaust ports 6 and 7 formed in the furnace 2. An exhaust fan and an anti-pollution device such as a scrubber, and the like, are installed at the tip end of the exhaust pipe 13. Furthermore, the opening 2A in the bottom portion of the furnace 2 is oval in cross-sectional shape, for example.

FIG. 2 illustrates the variable opening part 2B, formed by opening-and-shutting doors 16, 17, 18 and 19, which can be freely opened and shut and is made of, for example, a refractory board, or the like. The variable opening and shutting 2B is installed on the inside of the opening 2A in the furnace 2.

Figure 3:
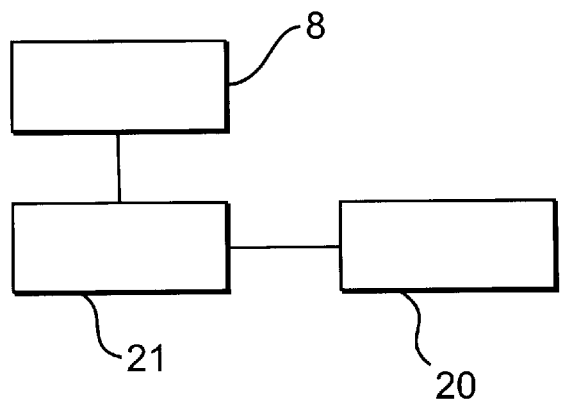
FIG. 3 is a block diagram illustrating the intercoupling of the temperature measuring device, the control device, and the altering mechanism in the quartz glass manufacturing apparatus of the present invention.

FIG. 3 is a block diagram illustrating the intercoupling of the temperature measuring device 8, a control device 21, and the altering mechanism 20 in the quartz glass manufacturing apparatus of the present invention. The opening-and-shutting doors 16 through 19 are opened and shut by means of the altering mechanism (or opening-and-closing mechanism) 20 consisting of a motor, or the like. The driving of the opening-and-shutting mechanism 20 is controlled by a control device 21 on the basis of the temperature distribution inside the furnace 2 measured by the temperature measuring device (for example, a thermocouple) 8.

Figure 5:
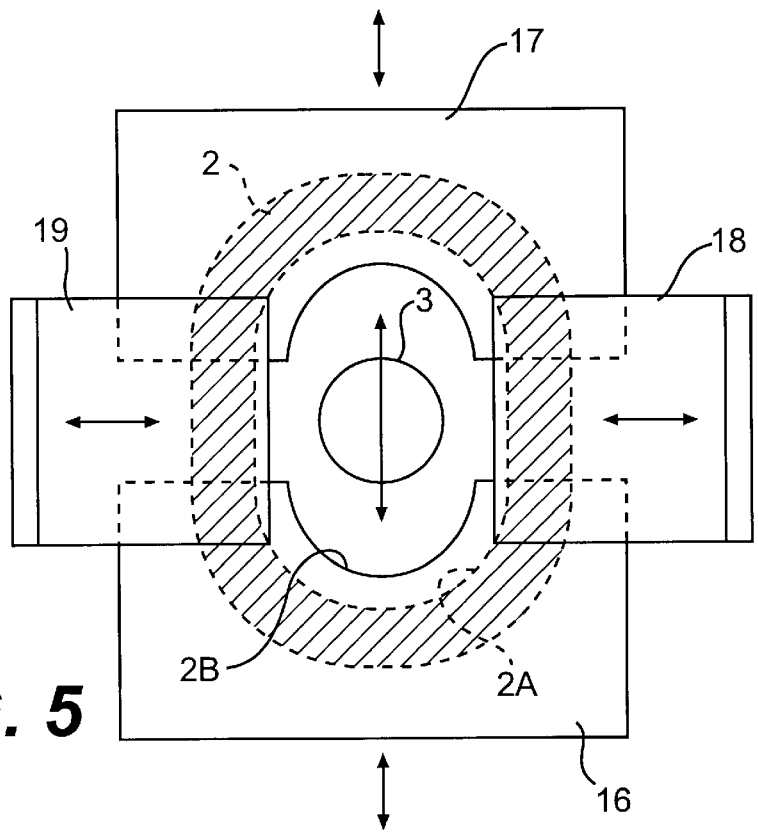
FIG. 5 illustrates the opening and shutting of the opening-and-shutting doors of the variable opening and shutting system of the present invention.
Figure 6:
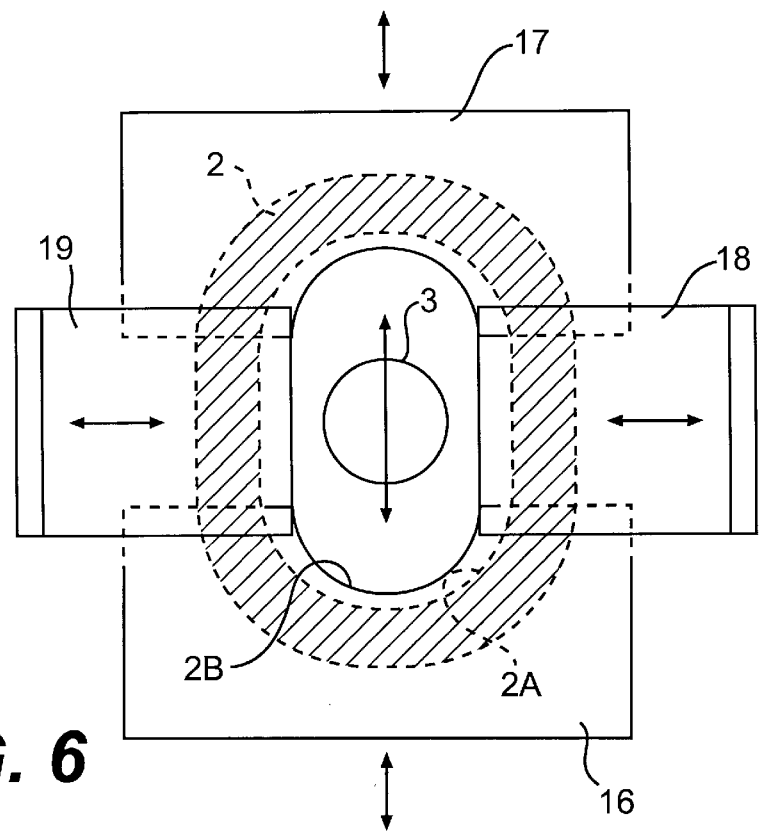
FIG. 6 illustrates the opening and shutting to a second position of the opening-and-shutting doors of the variable opening and shutting system of the present invention.
Figure 7:
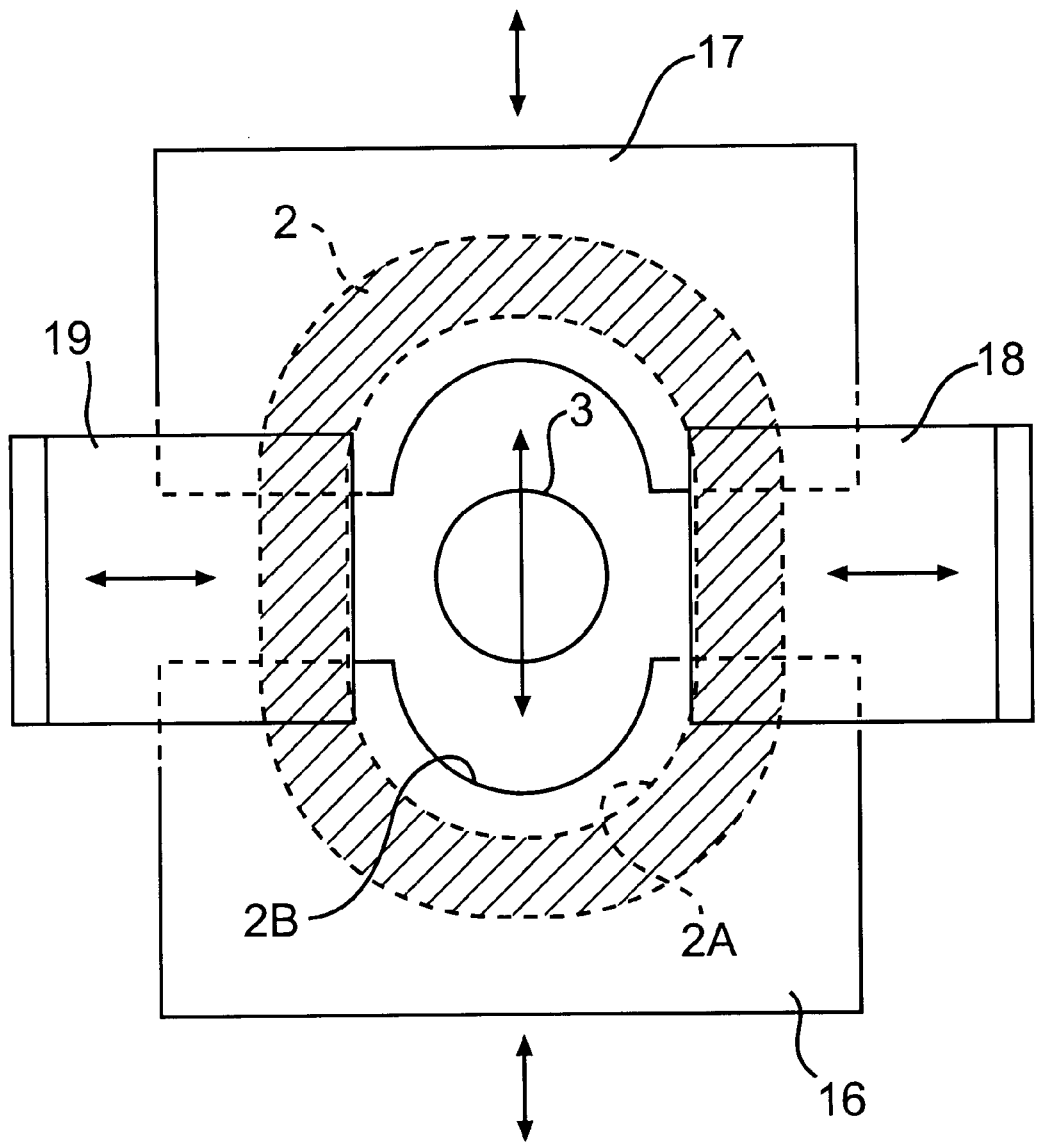
FIG. 7 illustrates the opening and shutting to a third position of the opening-and-shutting doors of the variable opening and shutting system of the present invention.

The variable opening and shutting system 2B is opened, for example, as shown in FIG. 5 by driving the opening-and-shutting doors 18 and 19, and the variable opening and shutting system 2B is opened as shown in FIG. 6 by driving the opening-and-shutting doors 16 and 17. Furthermore, the variable opening and shutting system 2B is opened to its maximum limit as shown in FIG. 7 by driving all of the opening-and-shutting doors 16 through 19.

The operation of the quartz glass manufacturing method of the instant invention will now be further described. After the target surface 3 has been heated to a sufficient temperature (2000° C. or greater), a raw-material gas, for example, $SiCl_4$, or the like, is supplied from the burner 1, and the synthesis of an ingot 15 is initiated by a hydrolysis reaction. Then, as an $SiO_2$ powder gradually accumulates on the target surface 3, this powder is dissolved and vitrified. The target surface 3 is caused to rotate about a supporting shaft 11, and is caused to swing in the left-right direction in FIG. 1, so that the ingot 15 is uniformly heated. Furthermore, the distance between the synthesized surface of the ingot and the burner 1 is monitored by the IR camera 5, and the target surface 3 is lowered so that this distance remains constant regardless of the growth of the ingot.

The exhaust that accumulates inside the furnace 2 is conducted to the outside of the furnace from the exhaust pipe 13 via the exhaust ports 6 and 7, so that overheating inside the furnace 2 is prevented. Specifically, the quantity of heat inside the furnace 2 is controlled by introducing air from the atmosphere at room temperature into the furnace 2 via the variable opening and shutting system 2B formed in the bottom of the furnace 2. An ingot 15 is obtained by continuing this state for several weeks.

The ingot 15 gradually grows so that the diameter is increased from the diameter of the target surface 3 at the time that synthesis is initiated. Accordingly, the area of the opening and shutting system 2B is substantially reduced as the ingot gets larger. When the area of the opening and shutting system 2B is reduced, the amount of secondary air entering from the opening and shutting system 2B is reduced, so that the amount of exhaust from the exhaust pipe 13 is reduced. At the same time, the release of radiant heat to the outside is also reduced, so that the temperature inside the furnace 2 rises.

If a deposit 30 adheres to the exhaust pipe 13, the pressure loss increases. As a result, the amount of exhaust is reduced so that the temperature inside the furnace 2 rises. When the temperature inside the furnace 2 rises in this way, the ingot 15 is heated in a non-uniform manner. The temperature distribution inside the furnace 2 is detected by the thermocouple 8, and the opening-and-shutting mechanism 20 is driven by the control device 21 so that the opening-and-shutting doors 16 through 19 are opened, thus increasing the area of the opening and shutting system 2B so that the temperature distribution inside the furnace 2 always remains constant. As a result, secondary air used for exhaust can be efficiently introduced into the furnace 2, so that the exhaust inside the furnace 2 can be conducted to the outside by the exhaust pipe 13 without stagnation. Accordingly, since the temperature, which has begun to rise inside the furnace 2, returns to the original temperature, the ingot 15 can be synthesized with the temperature inside the furnace 2 maintained at a more or less constant value.

Figure 4:
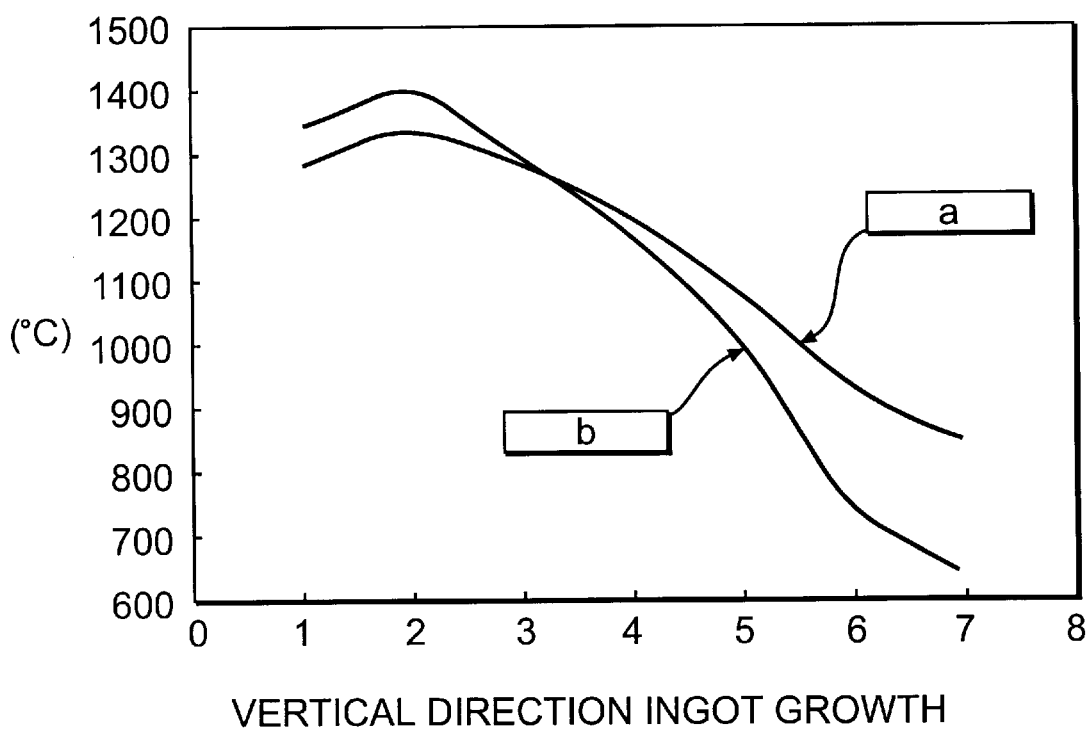
FIG. 4 is a graph that illustrates the temperature distribution in the vertical direction of the ingot.

Furthermore, as is shown in FIG. 4, the temperature distribution in the direction of growth of the ingot 15 is greatly reduced in a furnace where the area of the opening and shutting system 2B can be altered, as indicated by plot a, than it is in the conventional system in which the quantity of heat supplied from the burner is controlled with the area of the opening and shutting system 2B remaining fixed, as indicated in plot b. As a result, since the temperature variation in the furnace during the growth process of the ingot 15 can be reduced, the ingot 15 is uniformly heated resulting in a uniform ingot 15 which is also free of striae in the direction of growth.

As discussed above, the area of the variable opening and shutting system 2B is an oval shape. However, this area also could be a rectangular or a circular shape. Moreover, in the above working configuration, the target surface 3 is arranged so that it can be swung in the left-right direction or front-back direction in FIG. 1. However, it is not particularly necessary to swing the target surface. In cases where the target surface 3 is caused to swing, the symmetry of the opening area around the ingot can be maintained by driving the opening-and-shutting doors 16 and 17 in the same direction in synchronization with this swinging, thus further maintaining the temperature distribution inside the furnace at a constant value.

Moreover, as described above, the temperature inside the furnace 2 is detected by means of a thermocouple 8, and the opening-and-shutting doors 16 through 19 are opened and shut in accordance with the detection results. However, it would also be possible to store the temperature change inside the furnace 2 during synthesis of the ingot 15 as data beforehand, and to control the opening and shutting of the opening-and-shutting doors 16 through 19 on the basis of this data.

Further, as described above, the opening-and-shutting action of the opening-and-shutting doors 16 through 19 is controlled by means of a control device 21. However, it would also be possible to open and shut the opening-and-shutting doors 16 through 19 manually.

What follows are experimental results obtained for the uniformity of the refractive index in ingots synthesized by means of a quartz glass manufacturing apparatus constructed as described by the foregoing description. The experimental results will be presented in comparison with comparative examples.

(1) PRACTICAL EXAMPLE 1

An ingot with a diameter of approximately 350 mm and a thickness of approximately 1000 mm was synthesized by means of the quartz glass manufacturing apparatus constituting the above-mentioned working configuration of the present invention. During this synthesis, the opening and shutting system 2B was controlled between 360×500 mm (67% of the area of the furnace opening 2A) and 450×630 mm (oval shape). After a test sample (φ250×t 40 [mm]) was prepared in order to measure the uniformity of the refractive index of the ingot thus obtained, this test sample was maintained for 10 hours or longer at 1000° C., and was then gradually cooled at a temperature reduction rate of 10° C./hour so that strain was thoroughly eliminated. Afterward, the refractive index uniformity Δn was measured by the oil-on-plate method using an interferometer. Furthermore, the measurement of striae was accomplished by means of the pinhole method.

As a result, in Practical Example 1, a quartz glass was obtained that had a refractive index uniformity Δn of $1.0 \times 10^{-6}$ and was free of striae in all three directions. The refractive index distribution in the direction of the optical axis of a lens manufactured using this quartz glass showed center symmetry. Furthermore, the RMS value of the rotationally asymmetrical component was 0.0010 λ, and the RMS value of the residual difference component following 2.4-order curve fitting of the rotationally symmetrical component was 0.0008 λ. This glass sufficiently satisfied the specifications for a quartz glass used in photolithographic projection lenses, and especially a quartz glass for lenses used in a reduction exposure apparatus using short-wavelength light of 256 M or below.

(2) PRACTICAL EXAMPLE 2

An ingot 15 with a diameter of approximately 350 mm and a thickness of approximately 1000 mm was synthesized by means of the quartz glass manufacturing apparatus constituting the above-mentioned working configuration of the present invention. During this synthesis, the opening and shutting system 2B was controlled between 360×500 mm and 450×630 mm, and the process was performed so that a temperature distribution, such as that shown in FIG. 4, was obtained in the direction of growth of the ingot 15. After a test sample ($\phi$250×t 40 [mm]) was prepared in order to measure the uniformity of the refractive index of the ingot 15 thus obtained, this test sample was maintained for 10 hours or longer at 1000° C., and was then gradually cooled at a temperature reduction rate of 10° C./hour so that strain was thoroughly eliminated. Afterward, the refractive index uniformity $\Delta n$ was measured by the oil-on-plate method using an interferometer. Furthermore, the measurement of striae was accomplished by means of the pinhole method.

As a result, in Practical Example 2, a quartz glass was obtained that had a refractive index uniformity $\Delta n$ of $1.6 \times 10^{-6}$ and was free of striae in all three directions. The refractive index distribution in the direction of the optical axis of a lens manufactured using this quartz glass showed center symmetry. Furthermore, the RMS value of the rotational non-symmetrical element was 0.0008 $\lambda$, and the RMS value of the rotational symmetrical 2nd/4th-order residual was 0.0005 $\lambda$. This glass sufficiently satisfied the specifications for a quartz glass used in photolithographic projection lenses.

(3) COMPARATIVE EXAMPLE 1

An ingot 15 with a diameter of 350 mm and a thickness of 1000 mm was synthesized under the same conditions as in the above-mentioned Practical Example 1. In this case, the opening and shutting system 2B was maintained at a fixed value of 450×630 mm (oval shape). After a test sample ($\phi$250×t 40 [mm]) was prepared in order to measure the uniformity of the refractive index of the ingot 15 thus obtained, the refractive index uniformity $\Delta n$ and the striae were measured.

As a result, in Comparative Example 1, the refractive index uniformity $\Delta n$ was $5 \times 10^{-6}$, and observation from the side surface in the direction of the optical axis revealed laminar striae. The refractive index distribution in the direction of the optical axis of a lens manufactured from this quartz glass showed poor center symmetry; furthermore, the RMS value of the rotational non-symmetrical element was 0.0071 $\lambda$, and the RMS value of the rotational symmetrical 2nd/4th-order residual was 0.0078 $\lambda$. This glass did not satisfy the specifications for quartz glass used in photolithographic projection lenses.

(4) COMPARATIVE EXAMPLE 2

An ingot 15 with a diameter of 350 mm and a thickness of 1000 mm was synthesized under the same conditions as in the above-mentioned Practical Example 1. During this synthesis, the opening and shutting system 2B was maintained at a fixed value of 360×500 mm (67% of the area of the opening 2A). In this case, the area of the opening and shutting system was reduced to a point near the diameter of the ingot 15. At the time that synthesis was initiated, the diameter of the ingot was extremely large, and the quantity of gas supplied from the burner 1 was reduced. However, the temperature rise inside the furnace 2 could not be suppressed; the quantity of gas supplied from the burner 1 reached the lower limit value, and the flame supplied rode upward on rising air currents, thus returning to the burner 1 so that synthesis was impossible.

In regard to the correspondence between the above-mentioned working configuration and the claims, the opening-and-shutting doors 16 through 19 and the opening-and-shutting mechanism 20 constitute the above-mentioned altering mechanism, the thermocouple 8 constitutes the above-mentioned temperature measuring device, and the control device 21 constitutes the above-mentioned control system.

The quartz glass manufacturing apparatus and method of the instant invention thus allows the area of the opening and shutting system of the furnace to be altered in accordance with the growth of the ingot so that the temperature inside the furnace can be maintained at a more or less constant value during the manufacturing process. As a result, synthesis can be performed in an optimal manner under the same conditions at the beginning and end of the synthesis process. What results is the manufacturing of an ingot that is superior in terms of the uniformity of the refractive index and is free of striae.

Moreover, since the opening area of the opening and shutting system can be altered in accordance with the temperature inside the furnace, the temperature inside the furnace can be maintained at a more or less constant value. This results in the temperature distribution in the direction of growth of the ingot being eliminated so that an ingot which is free of striae can be manufactured.

Finally, the ingot is caused to undergo planar motion relative to the burner in accordance with the temperature distribution in the direction of the diameter of the head portion of the ingot. This results in the ingot being uniformly heated in the direction of the diameter of the ingot. Accordingly, the temperature distribution of the ingot can be eliminated so that an ingot with good uniformity can be manufactured.

As detailed above, opening-and-shutting doors 16 through 19, which open and shut the opening and shutting system 2B located in the bottom of the furnace 2, are installed on this opening and shutting system 2B. The opening-and-shutting doors 16 through 19 are opened in accordance with the growth of the ingot 15 on the target 3, so that the opening area of the opening and shutting system 2B is increased. As a result, exhaust can be efficiently conducted from the exhaust pipe 13, so that the temperature rise inside the furnace 2 can be suppressed, thus making it possible to synthesize the ingot 15 at a constant temperature.

What is claimed is:

1. A method for manufacturing quartz glass in a flame hydrolysis reaction inside a furnace, comprising the steps of:

mixing a gas containing Si, a combustion-supporting gas, and a combustible gas and discharging this mixed gas from a burner;

producing a quartz glass powder by causing the mixed and discharged gases to react in a flame within the furnace while an opening area of an opening and shutting system of the furnace is controlled; and producing a quartz glass ingot by depositing and vitrifying the quartz glass powder on a target surface facing an interior of the furnace, wherein said producing step includes the step of controlling the opening area of the opening and shutting system of the furnace in accordance with the amount of growth of the ingot on the target surface.

2. The method for manufacturing quartz glass in a flame hydrolysis reaction inside a furnace according to claim 1, wherein the opening area of the opening and shutting system of the furnace is varied in accordance with a temperature distribution within the furnace.

3. A method for manufacturing quartz glass in a flame hydrolysis reaction inside a furnace according to claim 1, further comprising the step of:

causing the target surface to move in a horizontally-planar direction with respect to the burner in accordance with the temperature distribution in a direction of a head portion of the ingot formed on the target surface.

4. A method for manufacturing quartz glass in a flame hydrolysis reaction inside a furnace according to claim 1, further comprising the step of:

monitoring a distance between a top surface of the ingot and the burner and causing the target surface to be lowered in a vertically-planar direction in accordance with a growth rate of the ingot formed on the target surface in order to keep a distance between the top surface of the ingot and the burner constant regardless of the growth of the ingot.

5. A method for manufacturing quartz glass in a flame hydrolysis reaction inside a furnace according to claim 2, wherein the opening area of the opening and shutting system of the furnace is varied by moving at least one of a plurality of movable doors attached to the furnace.

6. A method for manufacturing quartz glass in a flame hydrolysis reaction inside a furnace, comprising the steps of:

mixing a gas containing Si, a combustion-supporting gas, and a combustible gas and discharging this mixed gas from a burner;

producing a quartz glass powder by causing the mixed and discharged gases to react in a flame within the furnace while an opening area of an opening and shutting system provided near the bottom of the furnace is controlled; and producing a quartz glass ingot by depositing and vitrifying the quartz glass powder on a target surface facing an interior of the furnace.

7. The method for manufacturing quartz glass in a flame hydrolysis reaction inside a furnace according to claim 6, wherein the opening area of the opening and shutting system provided near the bottom of the furnace is varied in accordance with a temperature distribution within the furnace.

8. A method for manufacturing quartz glass in a flame hydrolysis reaction inside a furnace according to claim 6, further comprising the step of:

causing the target surface to move in a horizontally-planar direction with respect to the burner in accordance with the temperature distribution in a direction of a head portion of the ingot formed on the target surface.

9. A method for manufacturing quartz glass in a flame hydrolysis reaction inside a furnace according to claim 6, further comprising the step of:

monitoring a distance between a top surface of the ingot and the burner and causing the target surface to be lowered in a vertically-planar direction in accordance with a growth rate of the ingot formed on the target surface in order to keep a distance between the top surface of the ingot and the burner constant regardless of the growth of the ingot.

10. A method for manufacturing quartz glass in a flame hydrolysis reaction inside a furnace according to claim 7, wherein the opening area of the opening and shutting system of the furnace is varied by moving at least one of a plurality of movable doors attached to the furnace.

11. A method for manufacturing quartz glass in a flame hydrolysis reaction inside a furnace, comprising the steps of:

mixing a gas containing Si, a combustion-supporting gas, and a combustible gas and discharging this mixed gas from a burner;

producing a quartz glass powder by causing the mixed and discharged gases to react in a flame within the furnace while an opening area of an opening and shutting system of the furnace is controlled in order to control an amount of air from the atmosphere entering the furnace via the opening area; and producing a quartz glass ingot by depositing and vitrifying the quartz glass powder on a target surface facing an interior of the furnace.

12. The method for manufacturing quartz glass in a flame hydrolysis reaction inside a furnace according to claim 11, wherein the opening area of the opening and shutting system of the furnace is varied in accordance with a temperature distribution within the furnace.

13. A method for manufacturing quartz glass in a flame hydrolysis reaction inside a furnace according to claim 11, further comprising the step of:

causing the target surface to move in a horizontally-planar direction with respect to the burner in accordance with the temperature distribution in a direction of a head portion of the ingot formed on the target surface.

14. A method for manufacturing quartz glass in a flame hydrolysis reaction inside a furnace according to claim 11, further comprising the step of:

monitoring a distance between a top surface of the ingot and the burner and causing the target surface to be lowered in a vertically-planar direction in accordance with a growth rate of the ingot formed on the target surface in order to keep a distance between the top surface of the ingot and the burner constant regardless of the growth of the ingot.

15. A method for manufacturing quartz glass in a flame hydrolysis reaction inside a furnace according to claim 12, wherein the opening area of the opening and shutting system of the furnace is varied by moving at least one of a plurality of movable doors attached to the furnace.

* * * * *

UNITED STATES PATENT AND TRADEMARK OFFICE
CERTIFICATE OF CORRECTION

PATENT NO. : 6,018,964
DATED : February 1, 2000
INVENTOR(S) : YAJIMA et al.

It is certified that error appears in the above-identified patent and that said Letters Patent is hereby corrected as shown below:

Column 8, Line 67, after "producing" insert --a quartz glass ingot--.

Signed and Sealed this

Eighth Day of May, 2001

Attest:

NICHOLAS P. GODICI

Attesting Officer

Acting Director of the United States Patent and Trademark Office